Nov. 19, 1963 V. GEORGEFF 3,111,100
QUICK DIE CHANGE PRESS
Filed Jan. 16, 1958 9 Sheets-Sheet 1

INVENTOR
VASIL GEORGEFF
BY Henry L. Shenier
ATTORNEY

Nov. 19, 1963 V. GEORGEFF 3,111,100
QUICK DIE CHANGE PRESS
Filed Jan. 16, 1958 9 Sheets-Sheet 5

Fig. 5

INVENTOR
VASIL GEORGEFF
BY
ATTORNEY

Nov. 19, 1963  V. GEORGEFF  3,111,100
QUICK DIE CHANGE PRESS
Filed Jan. 16, 1958  9 Sheets-Sheet 8

INVENTOR
VASIL GEORGEFF
BY
ATTORNEY 3,111,100
QUICK DIE CHANGE PRESS
Vasil Georgeff, La Grange Park, Ill., assignor to Danly Machine Specialties, Inc., Chicago, Ill., a corporation of Illinois
Filed Jan. 16, 1958, Ser. No. 709,324
1 Claim. (Cl. 113—49)

My invention relates to a quick die change press and more particularly to a power press having means for changing the press dies in a rapid, convenient, and expeditious manner.

This application is a continuation in part of my co-pending application, Serial No. 604,437, filed August 16, 1956, now Patent No. 2,996,025, for a readily changeable die assembly for power presses.

In operation of a power press, one of the most difficult and time-consuming operations which must be performed is changing the press setup when a new part is to be produced on the press. In the course of this changeover, the old dies must be removed from the press and the new dies must be located accurately on the press bed to permit the upper die to be secured to the press slide and to permit the lower die to be secured to the press bed. The labor cost of this operation is high, owing to the high hourly wage rate of skilled die setters. Because of this high cost of changing the press dies, manufacturers make large runs of one part before changing the setup of a press, While this expedient reduces changeover labor costs, it introduces the necessity of storing and handling a very large number of parts. Imbalances in the manufacturer's inventory result. In the manufacture of consumer goods frequent model changes render obsolete many of the parts previously run, resulting in loss to the manufacturer.

In recent years the metal stamping industry has greatly increased the production rate of presses for producing large stampings. Modern presses are capable of higher over-all speeds with very little corresponding increase in the drawing speeds. In other words, the over-all press speed has been increased without exceeding the critical drawing speed of the metal being worked on. The increased production possible on modern presses has created new problems in manufacturing plants. In order to maintain steady employment, production in many instances must be controlled by the number or lengths of the working shifts. If long production runs are made, the storage and handling problems referred to hereinabove arise. If relatively short runs are made to maintain the storage of piece parts at normal levels, much production time is lost because of the difficulty of changing dies for each new production run. An obvious solution to the problems outlined hereinabove is the provision of a large number of presses, each using a different set of dies. This solution clearly is an uneconomical one.

Modern presses employ automatic handling equipment for feeding the material to be worked on into the press. In order to change the press dies in the prior art, much of this equipment must be moved to permit removal of the old dies and insertion of the new dies into the press. Each die change usually requires different mechanical handling equipment.

It has been suggested in the prior art that the dies to be assembled on the press be nested and placed on tracks which are run into the press bed to permit the dies to be secured to the press slide and bed. Such a system has not been practical in the prior art, owing to the difficulty of locating the dies properly and to the difficulty of securing the dies to the press bed and to the press slide. The difficulty of securing a die to the press drawing slide is particularly evident in a press in which the drawing slide is mounted within a blank holder slide.

Another suggestion which has been advanced in the prior art is the provision of a deformable upper die carried by the press working slide and lower dies which are run into the press and secured to the press bed for cooperation with the deformable upper die. A system of this nature not only has the inherent disadvantage outlined hereinabove of not locating the lower die properly on the press bed but is completely impractical for the formation of large stampings from sheet steel and similar materials.

I have invented a quick die change press which permits the dies of a press to be changed in a rapid, convenient and expeditious manner. My press includes means for accurately positioning the dies run into the press to permit the dies to be secured respectively to the press inner slide and to the press bed. I provide my assembly with means for rapidly and expeditiously securing the dies to the press bed and to the press slide. My press permits the dies to be changed without the excessively high labor cost incurred in changing the dies in presses of the prior art. While, in the prior art, a change in the dies used on a press requires a minimum of two hours' time, my press permits a change to be made in five minutes. In the prior art, for example, for a work week of 120 hours in which five die changes are made only eighty hours is actual production time, while forty hours' time is required to change the die setup. With my quick die change press for a work week of 120 hours in which ten die changes are made, actual production time is 115, while the die setup time required is only five hours. It will be seen that for twice the number of die changes production time on my press is increased by thirty-five hours or a percentage increase of 43½%. Further, my press results in a corresponding increase in time available for die tryout.

My quick die change press has the further advantage that it eliminates the need for excess press and plant capacity required for die tryout in bringing out new models. My press maintains very nearly the same efficiency of equipment utilization for short-run production as for long-run production. My press permits the use of improved handling equipment over that used in the prior art. This mechanical handling equipment need not be removed while dies are being set up. In the event of a breakdown on the press, the die in the press can readily be removed for repairs, and the press can be put back into production quickly. With my press a die change may be made during a working shift or whenever the required production quantity of the article produced by the dies being used has been reached.

One object of my invention is to provide a quick die change press with means for locating a die carrier ring precisely in position on the press bed.

Another object of my invention is to provide a quick die change press having improved means for arresting and locating the die carrier in position over the press bed.

Other and further objects of my invention will appear from the following description.

In general my invention contemplates the provision of a quick die change press having a frame and a bed and a drawing slide carried for reciprocation with respect to the bed. My press includes a movable bolster to which I secure the lower die of a pair of dies including an upper die adapted to be secured to the press slide. The frame of my press has openings through which a pair of dies carried by the bolster may be moved from a location adjacent the press to a position over the press bed. I provide my press with means for accurately positioning the bolster on the press bed to permit the bolster to be secured to the press bed and to permit the upper die to be secured to the press slide. I provide my press with means for rapidly and simply securing the upper die to the press drawing slide. When the setup of the press is to be changed, the movable bolster and dies in use are released and run out of the press, while the bolster carrying the new dies is run into the press over the bed. My press includes independent drive means for moving respective bolsters carrying pairs of dies and has means for preventing interference between the two bolsters.

In the accompanying drawings which form part of the instant specification and which are to be read in conjunction therewith and in which like reference numerals are used to indicate like parts in the various views.

Figure 1:
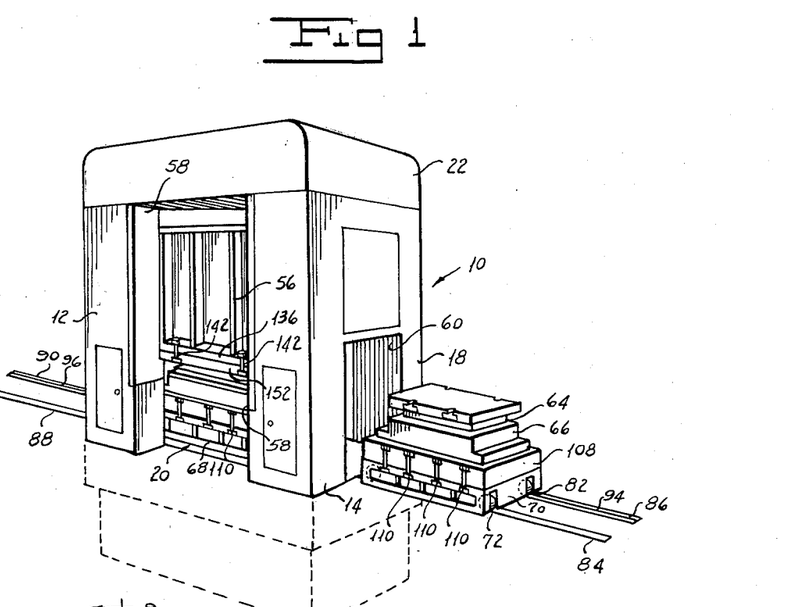
FIGURE 1 is a perspective view of one form of my quick die change power press.
Figure 2:
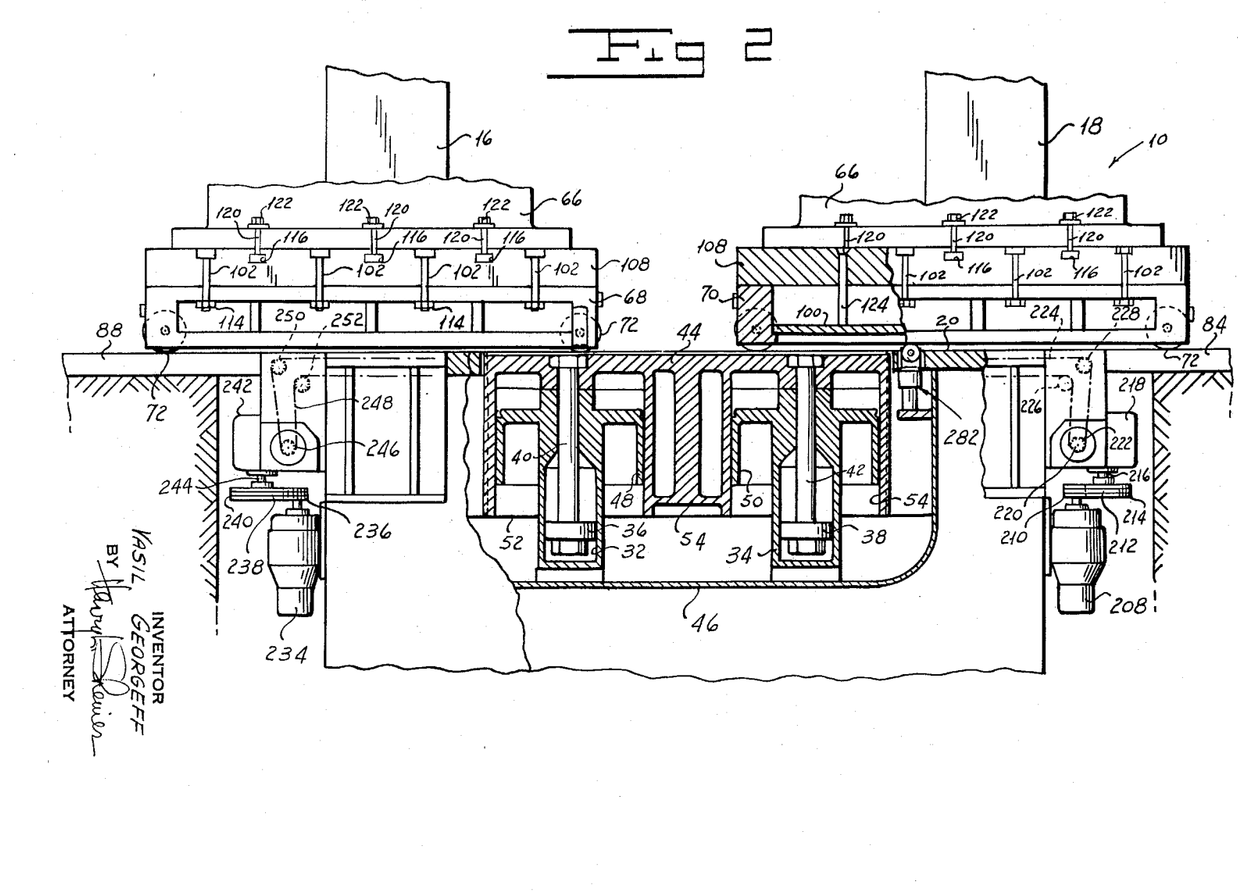
FIGURE 2 is a fragmentary sectional view of my quick die change power press.
Figure 3:
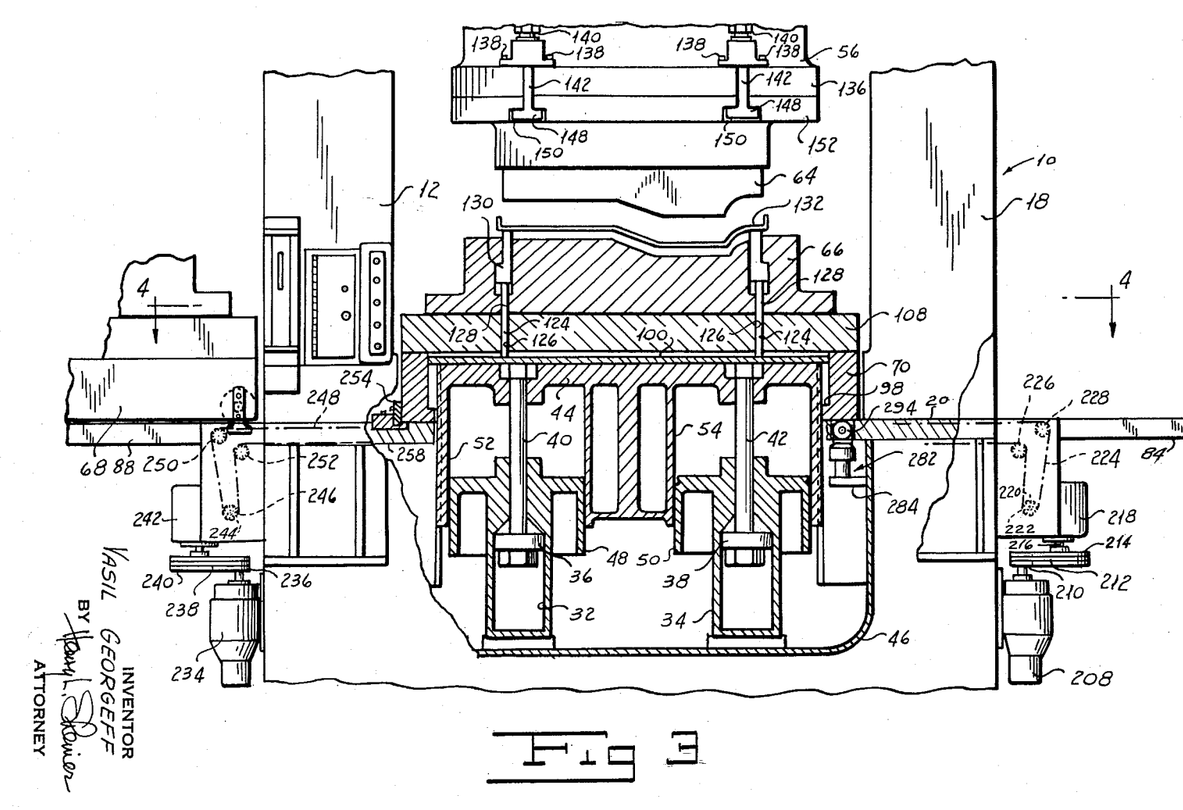
FIGURE 3 is a fragmentary front elevation of my quick die change power press with parts broken away and with other parts shown in section.

Referring now to FIGURES 1 to 4 of the drawings, one form of my quick die change power press, indicated generally by the reference character 10, includes a frame having four uprights 12, 14, 16 and 18 extending from the press bed 20 to the crown 22 of the press. Respective tie rods 24, 26, 28 and 30 hold the press assembled in a manner known to the art. In the form of my press shown, respective cylinders 32 and 34 are adapted to be supplied with a fluid such as air under pressure, to act on pistons 36 and 38 disposed in the respective cylinders. Pistons 36 and 38 have respective rods 40 and 42, the upper ends of which, as viewed in FIGURE 3, are secured to the press die cushion 44. With fluid under pressure supplied to the cylinders 32 and 34 below the pistons 36 and 38, the cushion 44 is raised to the position shown in FIGURE 3. When the fluid is relieved from the cylinders 32 and 34, the die cushion 44 sinks to the position shown in FIGURE 2. Cylinders 32 and 34 may be carried by any convenient means such as a housing 46 disposed below the press bed. Guides 48 and 50 formed on cylinders 32 and 34 ride in recesses 52 and 54 formed on the underside of cushion 44 to guide the cushion in its movement.

The press 10 includes an inner slide 56 slidably mounted in the press frame on suitable gibs in a manner known to the art. Uprights 12 and 14 form the front press opening 58 through which material to be worked on by the slide 56 may be fed to the press. Uprights 14 and 18 form an opening 60, and uprights 12 and 16 form an opening 62. These openings 60 and 62 permit the dies, to be described hereinafter, to be run into and out of the press. It is to be understood that while in the particular embodiment of my press shown the dies to be described hereinafter are run into and out of the press through side openings 60 and 62, they could as well be arranged to run into the press through front and rear openings, such as the opening 58. Preferably I arrange my press so that the movement of the dies is at right angles to the direction of material flow. In this manner I avoid any possible interference with automatic material handling equipment.

One pair of dies which may be used with my press includes an upper die 64 adapted to be secured to the inner slide 56 and a lower die 66 adapted to be secured to the press bed 20 in a manner to be described. Referring now to FIGURES 1 and 2, the form of my press shown includes respective bolster plate carrier rings 68 and 70. Since both the carrier rings 68 and 70 and their associated structures are the same, only one of the assemblies will be described in detail. For purposes of convenience I will describe in detail only the ring 70 which is shown in a position out of the press in FIGURE 1 and in a position in the press in the remaining figures of the drawings.

Referring now to FIGURES 1 to 5, the carrier ring 70 has a pair of front wheels 72 rotatably carried by respective shafts 74 disposed in recesses 76 in the front of the ring 70. A pair of shafts 78 disposed in spaced recesses 80 at the rear of the carrier ring 70 rotatably support the rear wheels 82 of the carrier. Tracks 84 and 86 extending from the press bed 20 for a distance outboard of the press to the right, as viewed in the drawings, are adapted to support the carrier ring 70 by its respective front wheels 72 and rear wheels 82 as it moves out of the press bed in a direction to the right, as viewed in FIGURE 1. Another pair of tracks 88 and 90 extending from the press bed outboard of the press to the left, as viewed in the drawings, are adapted to support the carrier ring 68 as it moves out of the press to the left, as viewed in the drawings.

Figure 5:
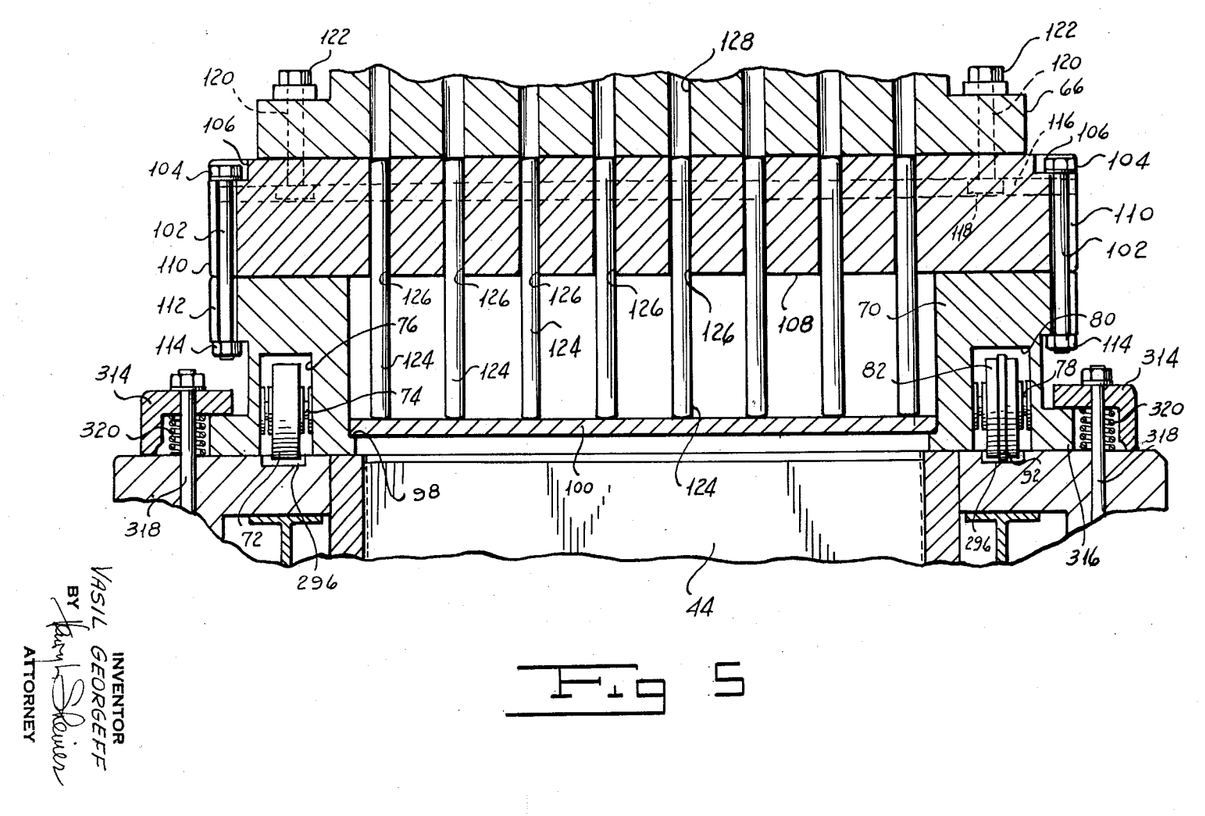
FIGURE 5 is a sectional view of my quick die change power press taken along the line 5—5 of FIGURE 4 and drawn on an enlarged scale.
Figure 6:
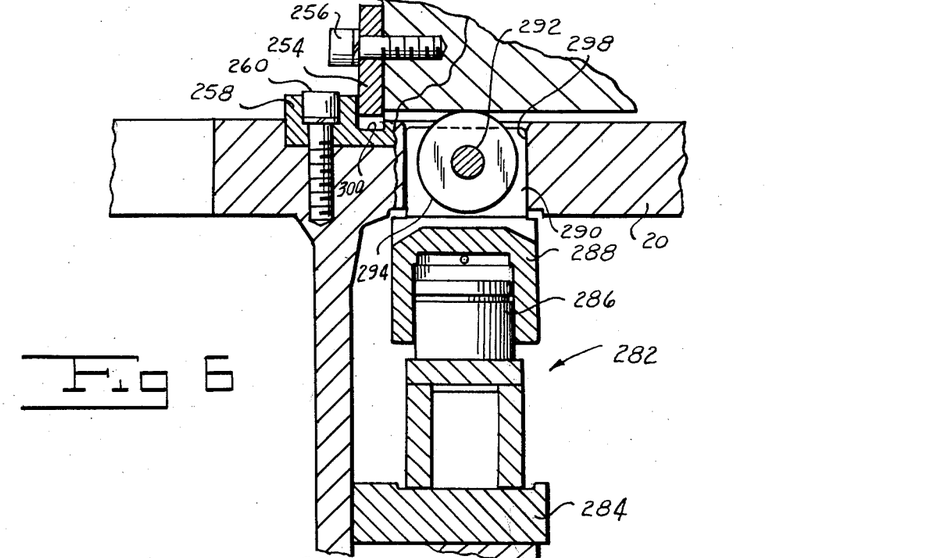
FIGURE 6 is a fragmentary sectional view of the bolster positioning means of my quick die change power press.
Figure 7:
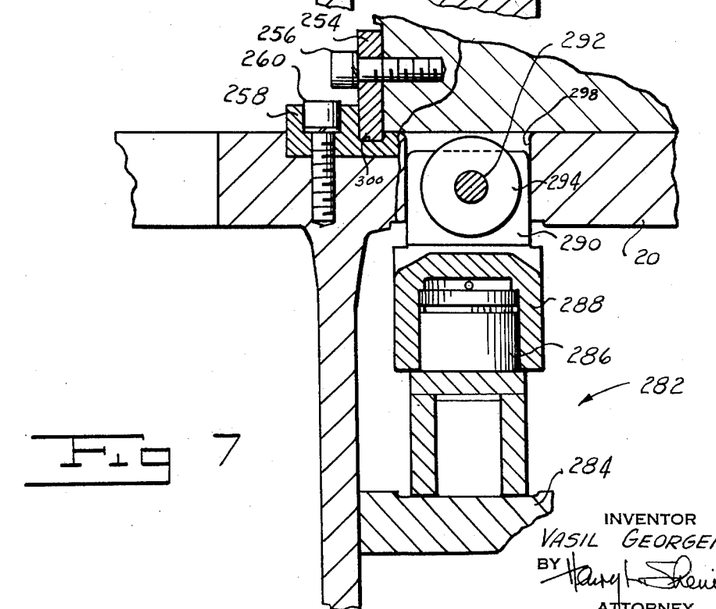
FIGURE 7 is a fragmentary sectional view of the bolster positioning means of my quick die change power press showing the relative position of the parts with the bolster located.

I form each of the rear wheels 82 with a peripheral tongue 92 arranged to ride in a groove 94 formed in the right-hand carrier track 86 or in a groove 96 formed in the left-hand carrier ring track 90.

I form the inner periphery of the ring 70 with a shoulder 98 adapted to support the pin plate 100 of the press. A plurality of bolts 102 having heads 104 disposed in recesses 106 are formed in the press bolster plate 108. Bolts 102 extend through slots 110 in the bolster plate 108 and through slots 112 formed around the edge of ring 70. Nuts 114 carried by the bolts 102 secure the bolster plate 108 to carrier ring 70. I form the bolster plate 108 with a plurality of T slots 116 in which I dispose the heads 118 of a number of bolts 120, the upper ends of which carry nuts 122 used to secure the lower die 66 to the bolster plate 108.

Plate 100 supports a plurality of die pins 124 which extend through openings 126 in bolster plate 108. With the die cushion 44 up in the position shown in FIGURE 3, plate 100 acts on the pins 124 to move the pins upwardly through bores 126 and into bores 128 in the lower die 66. In the course of their movement upwardly pins 124 act on knockout pins 130 in the lower die 66. As is known in the art when the inner slide 56 of the press descends to cause the upper die 64 to act on the workpiece 132, the force of impact is absorbed by the cushion 44. When the inner slide again moves upwardly, the fluid under pressure in cylinders 32 and 34 moves plate 100 to cause pins 124 to operate the knock-out pins 130 to knock the work out of the lower die 66.

While I have shown a form of my press including a die cushion 44 which necessitates the use of the carrier rings 68 and 70 which permits the cushion to move upwardly into the interior of the ring to act on pin plate 100, it is to be understood that in other types of presses in which the press is provided with a solid bed, no separate carrier ring is necessary. In a press of the type having a solid bed I provide wheels carried directly by the movable bolster plate to permit the bolster plate to be moved into and out of the press without the use of a separate carrier ring.

It is to be understood further that in the particular form of my press shown I use a pin plate 100 to obviate the necessity for using headed pins in place of the pins 124. If no separate pin plate is employed, headed pins must be used to prevent the pins from dropping out of the bolster plate when the die cushion 44 is retracted. These pins are expensive and require the dies with which they are used to be altered to accommodate the pins.

Figures 8, 9:
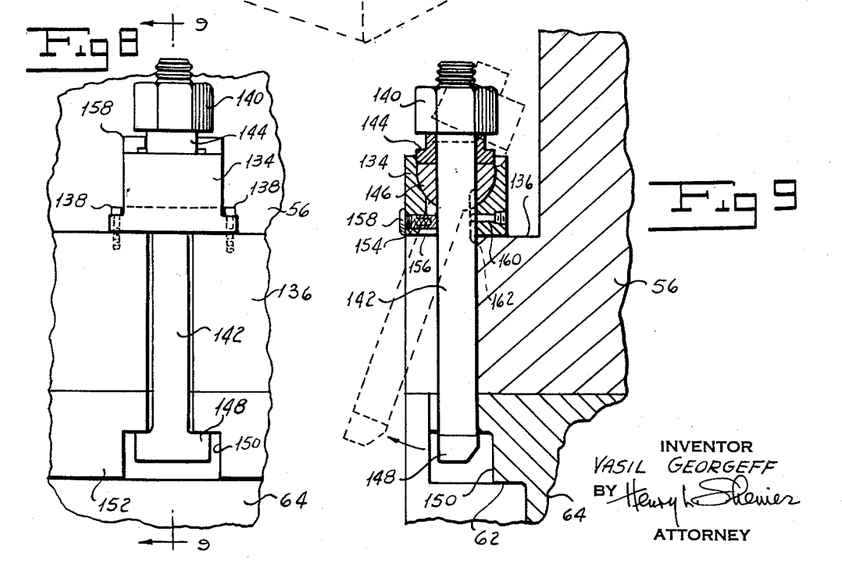
FIGURE 8 is a fragmentary elevation of one of the upper die clamping means of my quick die change power press.
FIGURE 9 is a fragmentary sectional view of one of the upper die clamping means of my quick die change power press.

Referring now to FIGURES 3, 8 and 9, one form of clamp which I employ to secure the upper die 64 to the press slide 56 includes a socket 134 secured by any convenient means such as machine screws 138 to a flange 136 formed on the inner slide 56. A nut 140 carried by the threaded upper end of the clamp arm 142 holds the arm on a fitting 144 retained in a ball 146 disposed in the socket 134. Arm 142 has a head 148 at its lower end adapted to swing into a T slot 150 formed in a flange 152 on the upper die. A spring 154 is retained by a screw 158 in a bore 156 formed in the socket 134. Spring 154 normally urges the arm 142 to rotate in a counterclockwise direction, as viewed in FIGURE 9, to position head 148 in the T slot 150. When the arm is thus positioned, nut 140 may be turned to draw arm 142 upwardly to clamp the die 64 to the slide 56 with the required pressure. Any convenient means, such as a limit switch 160 carried by socket 134 and having its movable element disposed in a slot 162, may be used to indicate when the upper die 64 is clamped to slide 56. When the upper die is to be unclamped, the nuts 140 are backed off and the arms 142 are swung to the broken-line position, shown in FIGURE 9, against the action of springs 154 to move heads 148 out of the T slots 150 to release the upper die. While in the drawings I have shown only two clamping arms 142 on one side of the upper die 64, it is to be understood that I may employ as many such clamping arms as are required. Alternatively to the form of clamping device shown in FIGURES 3, 8 and 9, I may also employ a clamping assembly such as is disclosed in the copending application of James C. Danly et al., Serial No. 634,449, filed January 16, 1957, now Patent No. 2,984,880, for a Readily Releasable Clamping Assembly.

Figures 10, 11, 12:
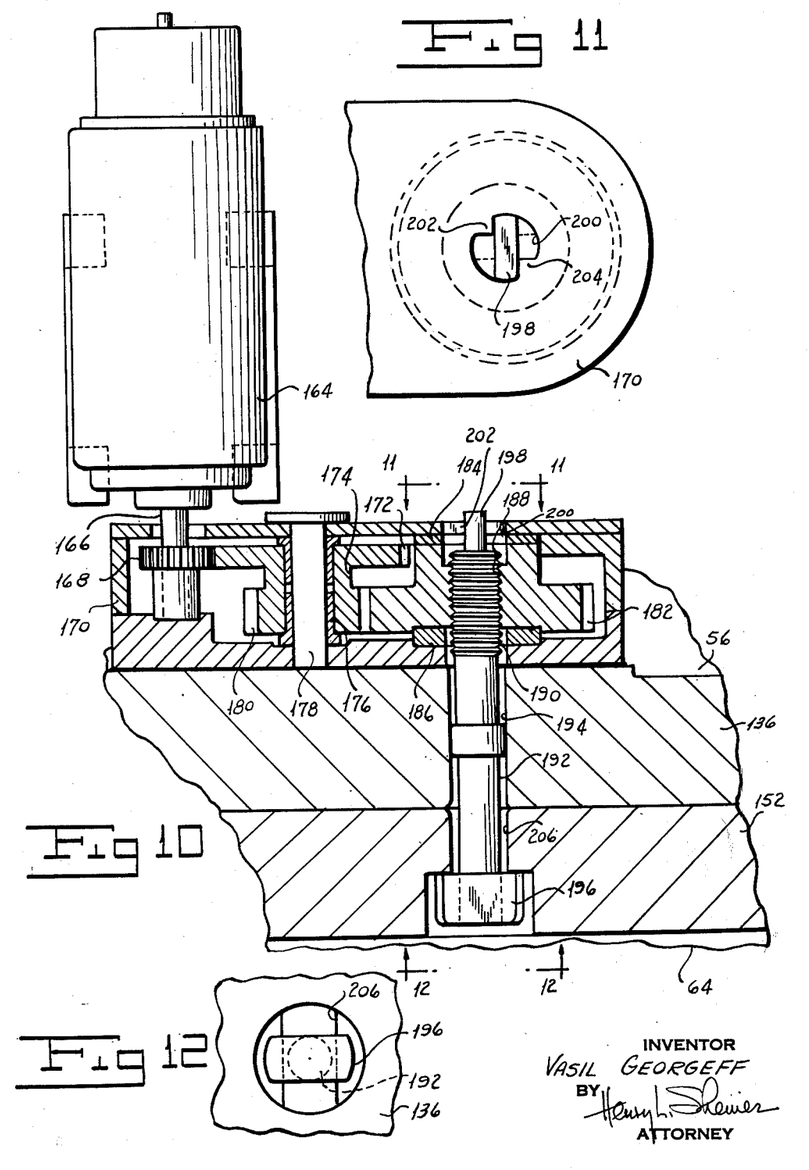
FIGURE 10 is a sectional view of an alternate form of upper die clamping means of my quick die change power press.
FIGURE 11 is a plan view of the upper die clamping means of my quick die change power press taken along the line 11—11 of FIGURE 10.
FIGURE 12 is a plan view of the form of my upper die clamping means shown in FIGURE 10 taken along the line 12—12 of FIGURE 10.

Referring now to FIGURES 10 to 12, I have shown a form of my clamping means which is particularly adapted for use with a press having a blank holder slide. This form of my clamping means obviates the necessity for inserting a tool through the blank holder slide to operate the clamping means. In this form of my clamping means a motor 164 carried by the inner slide 56 is adapted to be energized to drive a shaft 166 carrying for rotation with it a pinion 168 disposed in a housing 170. Pinion 168 engages and drives a gear 172 carried by a hub 174 rotatably supported on a bushing 176 carried by a shaft 178 supported in housing 170. Hub 174 carries a pinion 180 for rotation with the hub, which pinion 180 engages a gear 182 rotatably supported within the housing 170 on thrust bearings 184 and 186. I form a threaded central bore 188 in gear 182. The threads in bore 188 engage threads 190 formed on the shank of a clamping bolt 192. The shank of bolt 192 extends downwardly through a bore 194 formed in the inner slide 56. I form the lower end of bolt 192, as viewed in FIGURE 10, with a head 196 having a generally rectangular cross-sectional shape. I reduce the other end 198 of bolt 192 along a diameter to form an end having a generally rectangular cross-sectional area, the major axis of which is at right angles to the major axis of the cross-sectional area of head 196. End 198 extends through an opening 200 formed in the top of housing 170 and provided with a pair of stops 202 and 204. The head 196 is adapted to pass through a substantially rectangular opening 206 formed in the flange 152 of the upper die 64. As will be explained hereinafter, before the slide 56 is secured to the die 64, motor 164 has been driven to move end 198 and head 196 to the broken-line position shown in FIGURES 10 and 11. In this position of head 196 its longitudinal axis is parallel to the longitudinal axis of the cross section of opening 206 so that as the slide moves down over the upper die, the head 196 moves through opening 206. When the head 196 has thus been moved through the opening 206, motor 164 is energized to rotate the end 198 to the full-line position shown in FIGURES 10 to 12. When the end 198 has been moved to this position, the longitudinal axis of head 196 extends at right angles to the longitudinal axis of the cross section of opening 206. After end 198 has arrived at the full-line position in which it is against stops 202 and 204, upon continued rotation of gear 182, bolt 192 is drawn upwardly to secure the upper die firmly to the slide 56. When the upper die is to be released from the slide, the direction of rotation of motor 164 is reversed to move the bolt head and the end 198 to the broken-line position shown in the drawings and upon continued rotation to relieve the clamping pressure on the upper die.

Referring now to FIGURES 2 to 4 and 13, I provide independent drive means for moving the respective carrier rings 68 and 70 and the dies carried thereby into and out of the press. A first motor 208 carried by the press frame drives a pulley 210 which drives V belts or the like 212 to drive a pulley 214 carried by the input shaft 216 of a reduction gear assembly 218. The output shaft 220 of the reduction gearing 218 drives respective sprocket wheels 222 carried by shaft 220 for rotation with the shaft adjacent its respective ends. Each sprocket wheel 222 drives a chain 224 which passes over a pair of idler sprocket wheels 226 and 228 rotatably supported in any convenient manner on the machine frame. Each chain 224 also passes around a respective sprocket wheel 229 rotatably supported on the press frame. It is to be understood that while I have shown chains 224 for driving the carriages, I may as well employ other drive means such, for examples, as cables.

Figure 4:
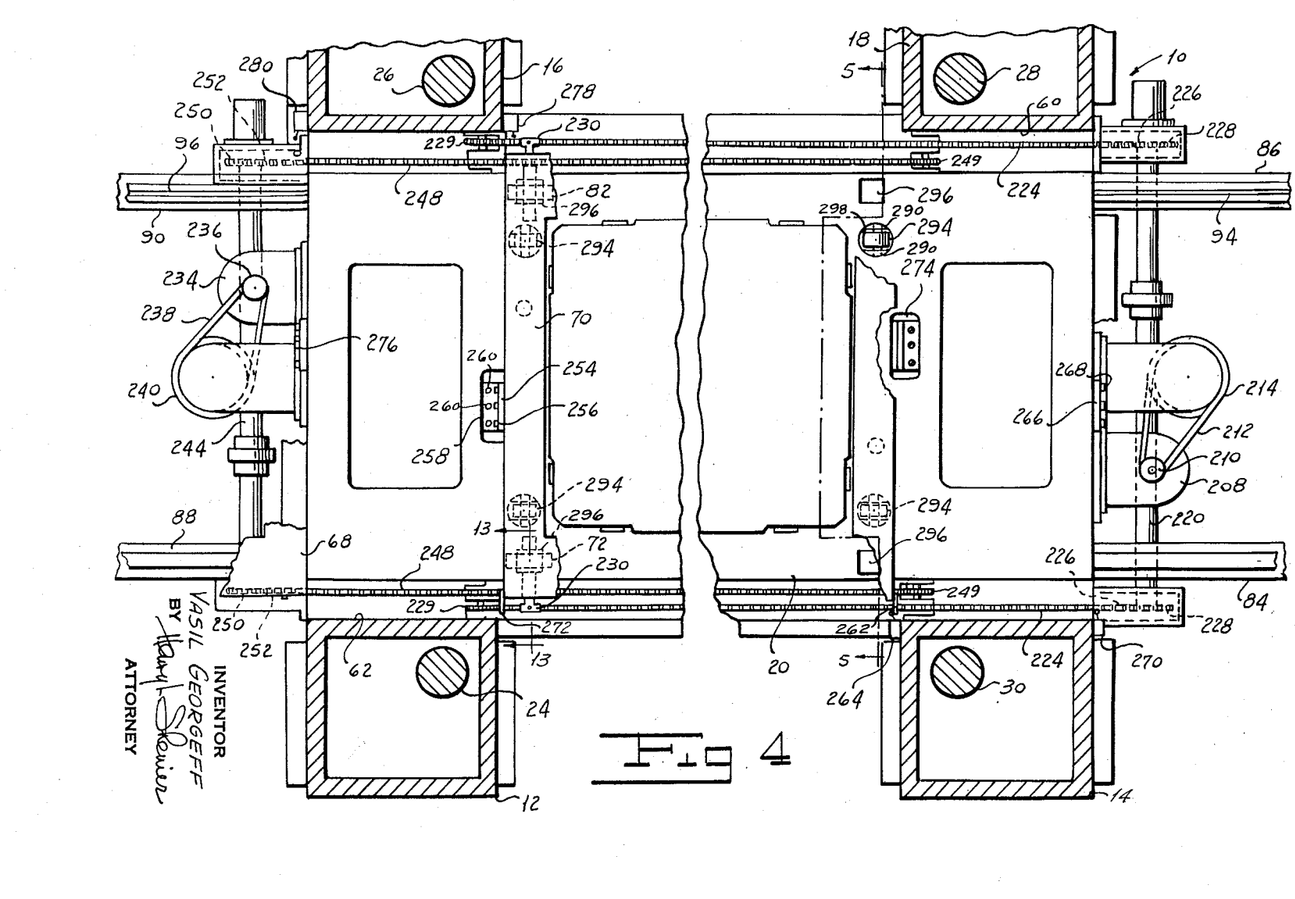
FIGURE 4 is a sectional view of my quick die change power press with parts removed and with other parts broken away and taken along the line 4—4 of FIGURE 3.
Figure 13:
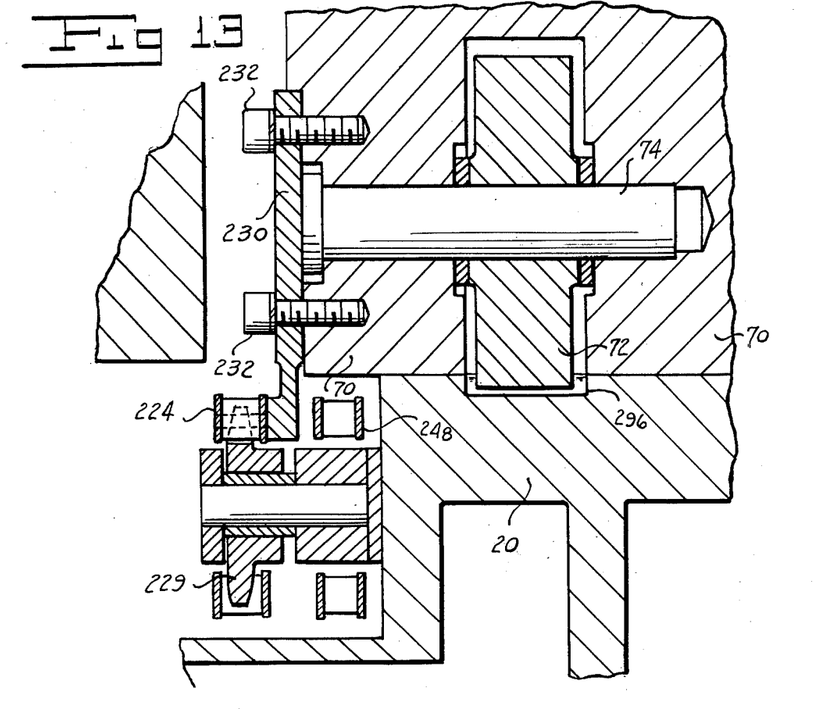
FIGURE 13 is a fragmentary sectional view of my quick die change power press taken along the line 13—13 of FIGURE 4 and drawn on an enlarged scale.

Referring to FIGURES 4 and 13, carrier ring 70 is provided with a pair of respective brackets 230 secured to the ring by any convenient means such as bolts 232. I dispose the brackets 230 on ring 70 adjacent its left-hand side, as viewed in FIGURE 4. Each bracket 230 engages one of the chains 224 to provide a drive connection between the chains and the carrier ring 70. It will be appreciated that when motor 208 is energized, shaft 220 is driven to drive chains 224. In one direction of rotation of motor 208 the carrier ring 70 and its bolster and dies are moved into the press and in the other direction of rotation of the motor the carrier ring, bolster and dies are moved out of the press.

A second motor 234 carried by the press frame drives a pulley 236 which drives V belts 238 to drive a pulley 240 carried by the input shaft of reduction gearing 242. The output shaft 244 of gearing 242 drives a pair of sprocket wheels 246 rotatably carried on the machine frame. Each sprocket wheel 246 drives a pitch chain 248 which is supported on respective idler sprocket wheels 250 and 252 rotatably supported in the machine frame. Chains 248 also pass around respective sprocket wheels 249 rotatably supported on the press frame. Brackets similar to the brackets 230 described in connection with carrier ring 70 provide a driving connection between carrier ring 68 and chains 248. From the foregoing description it will be seen that I have provided respective drives for the carrier rings 68 and 70 to permit each of the rings to be moved into and out of the press and to permit both carrier rings to be moved out of the press to allow work to be done within the press such as, for example, work on the press die cushion. I employ any suitable type of proximity device (not shown) known to the art to interrupt the drives of the respective carrier rings when the rings approach each other within a predetermined distance to prevent interference between the rings.

I provide my press with means for accurately locating the carrier ring 68 or 70 and its associated bolster plate and dies as the assembly is moved into the press over the press bed. Referring now to FIGURES 3, 4, 6 and 7, a stop 254 secured to the ring by any convenient means such as machine screws 256 engages a stop 258 secured to the ring by screws 260. As the carrier arrives at the position at which the stops 254 and 258 engage each other, a finger 262 secured to the carrier by any convenient means such as a screw or the like actuates a limit switch 264. As the carrier ring 70 is moved to its position out of the press, stop 254 engages a stop 266 secured to the press bed by machine screws 268 or the like. At the same time, a finger 272 actuates a limit switch 270. Respective inner and outer stops 274 and 276 and in the out limit switches 278 and 208 are provided for the left-hand carrier ring 68 which has a stop and fingers similar to the stop 254 and fingers 262 and 272 on the ring 70. In order to prevent a finger 262 or 272 from actuating both limit switches 264 and 270, I displace the switches 264 and 270 correspondingly on the upright 14. To prevent interference with the movement of either of the carrier rings 68 or 70, I displace the left-hand carrier ring stops 274 and 276 laterally from stops 254 and 266 and provide each carrier ring with openings to permit the ring to pass over the inner stop associated with the other ring.

Referring now to FIGURES 3, 4, 6 and 7, I mount a plurality of piston and cylinder units each of which is indicated generally by the reference character 282 on brackets 284 secured to the wall of the housing 46 in the bed of the press. Each of the units 282 includes a stationary piston 286 which cooperates with a cylinder 288 to which fluid such as air under pressure may be admitted from a suitable source not shown. Each cylinder 288 has a pair of bearing supports 390 in which I rotatably mount a shaft 292 carrying a roller 294 for rotation with the shaft. As will be explained hereinafter when the carrier ring 70, for example, is out of the press, it rides on the guide rails 84 and 86. As it moves into the press, it rides off the rails which terminate at the press bed. When the carrier ring 70 is approximately positioned in the press bed, the front and rear wheels 72 and 82 ride into wells 296 formed in the press bed. The rollers 294 extend upwardly through openings 298 in the press bed to support the carrier ring as its wheels ride into the recesses. As will be explained hereinafter, fluid under pressure is suplied to the cylinders 288 to cause the rollers 294 to be positioned to support the carrier ring at all times until the stop 254 engages the stop 258. This is the position of the roller 294 shown in FIGURE 6. When the stop 254 engages the stop 258, the carrier ring 70 actuates limit switch 264 to cause the fluid under pressure to be relieved from the cylinders 288 to permit the weight of the carrier bolster plate and dies to move the cylinders downwardly to the position shown in FIGURE 7. At this time, the carrier ring wheels sink into the wells 296. Stop 258 is provided with a groove or recess 300 into which the lower end of stop 254 moves as the carrier ring, bolster plate and dies settle on the press bed. This engagement of stop 254 with the slot or keyway 300 in stop 258 ensures that the dies are precisely positioned on the press bed to permit the upper and lower dies to be attached respectively to the press slide and to the press bed.

Figure 14:
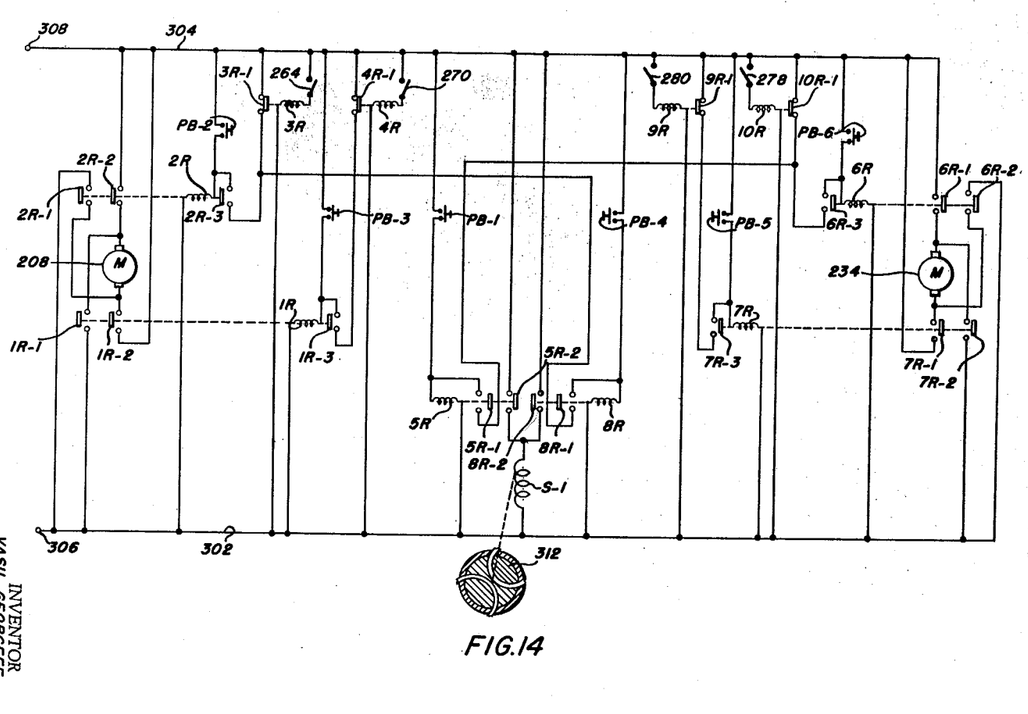
FIGURE 14 is a schematic view of one form of control circuit which may be used with my quick die change power press.

Referring now to FIGURE 14, one form of control circuit which may be used with my press includes respective conductors 302 and 304 connected to the terminals 306 and 308 of a suitable source of electrical energy.

Respective normally open relay switches 2R–1 and 2R–2 are closed in response to the energization of a winding 2R to energize drive motor 208 to drive the bolster 70 in toward the bed of the press. Normally open switches 1R–1 and 1R–2 are adapted to be closed in response to energization of winding 1R to complete the circuit of motor 208 to drive the bolster 70 out of the press bed.

Let us assume that the bolster 70 is in position over the press bed and that we wish to replace this bolster with the bolster 68. It will be appreciated that at this time solenoid winding S–1 is deenergized so that valve 312 is in a position at which the cylinders 288 are exhausted and bolster 70 rests firmly on the press bed. It will be understood that valve 312 controls the supply of fluid under pressure for cylinders 288. Under these conditions, I first actuate a push button switch PB–1. As the contact PB–1 closes it energizes a winding 5R to close respective switches 5R–1 to complete a holding circuit for winding 5R through a normally closed switch 10R–1 adapted to be opened by a winding 10R energized by the in limit switch 278 associated with bolster 68. At the same time switch 5R–2 completes the circuit of winding S–1 to operate valve 312 to supply fluid under pressure to the cylinders 288 to raise bolster 70 to the level of the tracks 84 and 86.

I then push PB–3 to energize winding 1R to close switches 1R–1 and 1R–2 to energize motor 208 in a direction to move bolster 70 out of the press bed. At the same time switch 1R–3 closes to complete a holding circuit for winding 1R through the normally closed switch 4R–1 controlled by winding 4R and out limit switch 270 associated with bolster 70. As the bolster 70 reaches its out limit position, switch 270 closes to energize 4R to open 4R–1 to interrupt the holding circuit of winding 1R to de-energize the motor drive circuit. It will be appreciated that winding 5R which controls S–1 remains energized through switch 278 and relay 10R.

I next actuate push button switch PB–6 to energize winding 6R to close switches 6R–1 and 6R–2 to energize motor 234 in a direction to drive bolster 68 in. Winding 6R also closes switch 6R–3 to complete the holding circuit for winding 6R through a switch 10R–1 which is opened by the energization of winding 10R in response to switch 278. When now the bolster 68 reaches its in limit position, switch 278 closes to interrupt the holding circuit of winding 6R to de-energize motor 234 and to interrupt the holding circuit of winding 5R to open the circuit of solenoid S–1 to permit valve 312 to return to its normal condition at which the cylinders 288 are connected to the atmosphere. In this manner I have replaced bolster 70 with bolster 68.

When I desire to return the bolster 70 to its position over the press bed to replace bolster 68, I first actuate a push button PB–4 to energize winding 8R to close switch 8R–2 to energize S–1. Winding 8R also closes switch 8R–1 to complete its own holding circuit through normally closed switch 3R–1 which is responsive to winding 3R under the control of the in limit switch for bolsters 70. I next close switch PB–5 to complete the circuit of winding 7R to close contacts 7R–1 and 7R–2 to energize motor 234 in a direction to move bolster 68 out of the press. Winding 7R also closes contact 7R–3 to complete its own holding circuit through a switch 9R–1 operated by a winding 9R controlled by switch 280. As bolster 68 reaches its out limit position it momentarily opens switch 280 to interrupt the holding circuit of winding 7R to de-energize motor 234.

I now actuate PB-2 to energize a winding 2R to close contacts 2R-1 and 2R-2 to energize motor 208 in a direction to move bolster 70 into the press. As bolster 70 reaches its in limit position, it closes switch 264 to interrupt the holding circuit of winding 2R to de-energize motor 208. At the same time it opens the holding circuit of winding 8R to de-energize the solenoid winding S-1 to connect the cylinders 288 to the atmosphere to permit bolster 70 to sink to the press bed.

In operation of my quick die change power press, assuming a pair of dies on a carrier ring such as the ring 68 are in use on the press and I desire to change the dies to the dies 64 and 66 carried by the ring 70, I first move the inner slide 56 in a manner known to the art to the bottom of its stroke and exhaust the air from the upper chambers of cylinders 32 and 34 to permit the cushion 44 to move to its lowest position. If desired, I may employ a limit switch (not shown) actuated by the cushion in its lowest position to enable the carrier control circuit to permit the carriers to be moved. When this has been done, I release the upper die from the inner slide. If the type clamping means shown in FIGURES 8 and 9 is employed on the press, I back off the nuts 140 and swing the clamping bolts to the broken-line position shown in FIGURE 9 to release the upper die from the slide and run the slide to the top of its stroke. If the form of clamping means shown in FIGURES 10 to 12 is employed, I energize motor 164 to drive the bolts 192 to bring the end 198 to the broken-line position against stops 202 and 204. In this position of the bolt the inner slide may readily be moved to the top of its stroke, withdrawing the heads 196 through the openings 206 in the upper die. After the upper die has thus been unclamped, I again run the slide to the top of its stroke. After this has been done, I remove the clamps 314 holding the carrier ring 68 to the press bed. It is to be understood that ordinarily the weight of the bolster plate 108, the lower die 66 and the ring 68 or 70 is sufficient to hold the lower die in place. Preferably, however, I use the clamps 314 to secure the bolster carrier ring to the press bed. These clamps ensure that the lower die remains in position, even where re-entrant dies are employed.

After the upper die has been released from the slide and the lower die has been released from the press bed, I actuate push-button PB-4 to complete the circuit of winding 8R to close switches 8R-1 and 8R-2. Switch 8R-2 energizes solenoid S-1 to actuate valve 312 to supply fluid under pressure to the cylinders 88 to raise the carrier ring to move the key formed by stop 254 out of the keyway or slot 300 formed in stop 258. Closing of switch 8R-1 completes a holding circuit for winding 8R through switch 3R-1 under the control of the in limit switch 264 of carrier 70. After the carrier 68 has thus been raised, I energize its associated drive motor 234 in a direction to move ring 68 out of the press. When the ring reaches its outer limit position, switch 280 is operated to interrupt the circuit of the drive motor.

After the press has thus been cleared, I operate push-button PB-2 to energize winding 2R to close switches 2R-1 and 2R-2 to energize motor 208 to rotate in a direction to move the carrier ring 70 supporting the bolster plate 108 and the upper and lower dies 64 and 66 into the press. When the carrier ring reaches its "in" position, stop 254 engages stop 258 and finger 262 actuates limit switch 264 to energize winding 3R to interrupt the holding circuit of winding 2R to interrupt the drive motor circuit. Energization of winding 3R to open switch 3R-1 also interrupts the holding circuit of winding 8R to de-energize solenoid S-1 to permit valve 312 to assume a position in which it connects cylinders 88 to the atmosphere to exhaust the air from the cylinders and permit the carrier ring 70 to settle on the press bed with the lower portion of stop 254, as viewed in FIGURE 6, settling in slot or keyway 300 precisely to position the dies. In the course of this movement of the ring, the wheels of the ring settle into the wells 296. It will be appreciated that the carrier comes to a stop slightly before the fluid is exhausted from the cylinders. If I employ the type clamping means shown in FIGURES 9 and 10 in the course of this movement bolts 142 are cammed outwardly to the broken-line position shown in FIGURE 9 and are then permitted to move under the influence of springs 154 to a position at which heads 148 are disposed in slots 150. I then turn nuts 140 to clamp the upper die to the slide. If I use the type clamping means shown in FIGURES 10 to 12 in the course of movement of the inner slide 56 downwardly, the heads 196 are in a position at which they enter openings 206. With the slide at the bottom of its stroke I energize motor 164 to rotate the bolts first to a position at which the longitudinal axis of head 196 is at right angles to the longitudinal axis of the cross section of 206. I continue rotation of the motor until the desired clamping pressure has been reached. I may accomplish this, for example, by means of a friction clutch between motor 164 and the gear train for driving the bolts. It is to be understood that if desired I may use the clamping assembly disclosed in the copending application, Serial No. 634,449, now Patent No. 2,984,880, referred to hereinabove.

After the upper die 64 has thus been clamped to the slide 56, I raise the slide to the top of its stroke and admit air to the cylinders 32 and 34 to move cushion 44 to its operative position. The press is now ready for operation.

It is to be understood that, while I have shown independent carrier rings 68 and 70 for the bolster plates, where the press has a solid bed employing no die cushion, I may dispose the wheels directly in the bolster plate, doing away with the necessity for employing a separate carrier ring.

I will be seen that I have accomplished the objects of my invention, I have provided a quick die change power press which permits the dies of a press to be changed in a simple, rapid and expeditious manner. My press permits advantage to be taken of the high speed operation of modern power presses without excessive production time being used for die changes. M press includes means for accurately locating dies moved into the press bed in the course of a change in the setup of the press. My press includes simple means for securing the upper die to the press drawing slide. The arrangement of my press is such that dies may be changed without disturbing automatic material handling equipment used with the press.

It will be understood that certain features and subcombination are of utility and may be employed without reference to other features and subcombinations. This is contemplated by and is within the scope of my claims. It is further obvious that varoius changes may be made in details within the scope of my claims without departing from the spirit of my invention. It is, therefore, to be understood that my invention is not to be limited to the specific details shown and described.

Having thus described my invention, what I claim is:

A quick die change power press including in combination a frame, a bed, a working slide mounted in the frame for movement with respect to the bed, a bolster, a pair of coacting dies carried by said bolster and comprising an upper die adapted to be secured to the working slide and a lower die, means comprising wheels for supporting said bolster for movement from a first location adjacent the press to a second location over the bed at which the upper die can be secured to the slide, drive means for moving said bolster from said first location to said second location, means forming wheel wells in said bed, said wheel wells adapted to receive said wheels to permit said bolster to rest on said bed, said wheels being adapted to ride over said wells as said bolster arrives at said second location, auxiliary means comprising rollers and means mounting said rollers for movement with respect to the press bed from a first position at which they are adapted to support said bolster as said wheels ride over said wells to a second position at which said bolster is permitted to rest on the press bed in said second location, means for supporting said rollers in said first position as said bolster moves from said first location to said second location, means for stopping said bolster in said second location, and means responsive to the arrival of said bolster at said second location for releasing said supporting means to permit said rollers to move to said second position to lower said bolster, said stopping means comprising a first stop, associated with one of said bolster and bed and providing a key, and a second stop formed with a keyway and associated with the other of said bolster and bed, said first stop being adapted to engage said second stop when said bolster arrives at said second location, said key engaging said keyway as said lowering means is operated.

References Cited in the file of this patent

UNITED STATES PATENTS

| | | |
|---|---|---|
| 1,607,073 | Gros | Nov. 16, 1926 |
| 1,607,074 | Gros | Nov. 16, 1926 |
| 1,863,729 | Rafter | June 21, 1932 |
| 2,186,799 | Boker | Jan. 9, 1940 |
| 2,241,344 | Graham | May 6, 1941 |
| 2,317,440 | Cannon | Apr. 27, 1943 |
| 2,332,135 | Dievers | Oct. 19, 1943 |
| 2,543,498 | Japikse | Feb. 27, 1951 |
| 2,647,784 | Janiszewski | Aug. 4, 1953 |
| 2,755,758 | Johansen | July 24, 1956 |
| 2,996,025 | Georgeff | Aug. 15, 1961 |
| 3,002,479 | Johansen et al. | Oct. 3, 1961 |

FOREIGN PATENTS

| | | |
|---|---|---|
| 128,570 | Great Britain | 1921 |